US011085659B2

(12) United States Patent
Lehman et al.

(10) Patent No.: US 11,085,659 B2
(45) Date of Patent: Aug. 10, 2021

(54) MONITORING FOR SIGNAL PULSES ON ONE OR MORE ANALOG INPUTS OF A BUILDING CONTROLLER

(71) Applicant: Honeywell International Inc., Morris Plains, NJ (US)

(72) Inventors: Peter Lehman, Excelsior, MN (US); Michael A. Pouchak, St. Anthony, MN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 144 days.

(21) Appl. No.: 16/436,669

(22) Filed: Jun. 10, 2019

(65) Prior Publication Data

US 2020/0386427 A1    Dec. 10, 2020

(51) Int. Cl.
| | | |
|---|---|---|
| F24F 11/54 | (2018.01) | |
| F24F 11/58 | (2018.01) | |
| F24F 11/30 | (2018.01) | |
| F24F 11/64 | (2018.01) | |
| F24F 11/88 | (2018.01) | |
| G05B 19/042 | (2006.01) | |
| F24F 11/65 | (2018.01) | |
| F24F 140/50 | (2018.01) | |

(52) U.S. Cl.
CPC ............ *F24F 11/30* (2018.01); *F24F 11/54* (2018.01); *F24F 11/58* (2018.01); *F24F 11/64* (2018.01); *F24F 11/65* (2018.01); *F24F 11/88* (2018.01); *G05B 19/042* (2013.01); *F24F 2140/50* (2018.01); *G05B 2219/2614* (2013.01)

(58) Field of Classification Search
CPC combination set(s) only.
See application file for complete search history.

(56) References Cited

U.S. PATENT DOCUMENTS

| | | | |
|---|---|---|---|
| 6,185,508 B1 * | 2/2001 | Van Doorn | ........ G01R 21/1331 |
| | | | 324/140 R |
| 6,341,493 B1 | 1/2002 | Shepeck et al. | |
| 6,936,989 B2 | 8/2005 | Hogan | |
| 7,049,976 B2 | 5/2006 | Hunt et al. | |
| 9,250,308 B2 | 2/2016 | Bowman et al. | |
| 9,859,826 B2 | 1/2018 | Barth | |
| 2002/0042683 A1 | 4/2002 | Shincovich | |
| 2003/0155428 A1 * | 8/2003 | Fiegle | ...................... F24F 11/30 |
| | | | 236/49.3 |
| 2007/0159978 A1 | 7/2007 | Anglin et al. | |

(Continued)

OTHER PUBLICATIONS

Nalla, "Achieve Accurate Metering in Modern Nonsinusoidal Power System Conditions," Schweitzer Engineering Laboratories, 12 pages, 2018.

(Continued)

*Primary Examiner* — Kidest Bahta
(74) *Attorney, Agent, or Firm* — Seager, Tufte & Wickhem, LLP (57) ABSTRACT

A Heating, Ventilating and Air Conditioning (HVAC) controller comprising a housing, a plurality of inputs, a plurality of outputs, a first controller configured to detect signal pulses the plurality of inputs and store information related to the detected signal pulses, and a second controller comprising an event driven controller configured to make event driven requests to the first controller the stored information.

20 Claims, 10 Drawing Sheets

(56) References Cited

U.S. PATENT DOCUMENTS

| | | | |
|---|---|---|---|
| 2007/0266716 A1 | 11/2007 | Klein et al. | |
| 2009/0167291 A1* | 7/2009 | Richeson | G01D 4/004 |
| | | | 324/107 |
| 2009/0292403 A1 | 11/2009 | Howell et al. | |
| 2010/0153036 A1* | 6/2010 | Elwarry | G01R 21/133 |
| | | | 702/62 |
| 2012/0280833 A1* | 11/2012 | Jonsson | G06F 13/385 |
| | | | 340/870.02 |

OTHER PUBLICATIONS

"Power Measurement Basics," Agilent Technologies, 65 pages, 2005.

"Monitoring Energy Via Uitlity Meter Pulse Output," OpenEnergyMonitor, 3 pages, accessed May 30, 2019.

"What are KYZ Pulses?" Solid State Instruments, 2 pages, Mar. 2011.

* cited by examiner

MONITORING FOR SIGNAL PULSES ON ONE OR MORE ANALOG INPUTS OF A BUILDING CONTROLLER

TECHNICAL FIELD

The disclosure relates generally to building controllers, and more particularly to heating, ventilating, and air conditioning (HVAC) controllers.

BACKGROUND

Building control systems are often used to help control a building's environment, such as temperature, humidity, air quality, lighting, security and/or other aspects of a building's environment. An example building control system may include a Heating, Ventilation, and/or Air Conditioning (HVAC) system used to control the comfort level within a building. Such HVAC systems typically include an HVAC controller that controls various HVAC components of the HVAC system in order to affect and/or control one or more environmental conditions within the building. A need remains for improved building controllers.

SUMMARY

This disclosure relates generally to controllers for heating, ventilating, and air conditioning (HVAC) systems, and more particularly to controllers for receiving analog electrical signals and detecting signal pulses from the analog electrical signals. In some cases, the analog electrical signal is also converted to a digital value via an analog-to-digital converter, thereby concurrently providing two different outputs including a detected signal pulse output and a digital representation of the analog electrical signal output. In some cases, when the analog input terminal is connected to a device that does not produce a pulsed output, such as a temperature sensor, the detected signal pulse output may have little meaning while the digital representation of the analog electrical signal output may be used in controlling the HVAC system. When the analog input terminal is connected to a device that does produces signal pulses, such as a pulsed energy meter, the detected signal pulse output may be used to monitor energy usage and/or perform some other function, while the digital representation of the analog electrical signal output may have little meaning.

In one particular example, an HVAC controller for controlling operation of at least part of an HVAC system includes a housing, a plurality of inputs carried by the housing and accessible from outside of the housing, a plurality of outputs carried by the housing and accessible from outside of the housing, a first controller housed by the housing and operatively coupled to the plurality of inputs and the plurality of outputs, the first controller may be configured to detect signal pulses on each of at least one of the plurality of inputs and store information related to the detected signal pulses, and a second controller housed by the housing and operatively coupled to the first controller, the second controller includes an event driven controller that may be configured to make event driven requests to the first controller for at least some of the stored information related to the detected signal pulses.

Alternatively or additionally to the foregoing, the first controller may be configured to repeatedly receive a voltage value representative of an analog voltage at each of the at least one of the plurality of inputs, and to compare the repeatedly received voltage values to a corresponding voltage threshold setting stored in a memory of the first controller to detect the signal pulses on each of the at least one of the plurality of inputs.

Alternatively or additionally to any of the embodiments above, the first controller may be configured to also make available to the second controller the voltage value representative of the voltage at each of the at least one of the plurality of inputs upon request by the second controller.

Alternatively or additionally to any of the embodiments above, the first controller may be configured to detect signal pulses on each of at least two of the plurality of inputs and store information related to the detected signal pulses, and the second controller may be configured to make a first event driven request to the first controller for at least some of the stored information related to the detected signal pulses associated with a first one of the at least two of the plurality of inputs, and is further configured to make a second event driven request to the first controller for the voltage value representative of the voltage at a second one of the at least two of the plurality of inputs.

Alternatively or additionally to any of the embodiments above, the second controller may make event driven requests to the first controller at a rate that is less than one-fifth of the rate that the first controller repeatedly receives the voltage values representative of the voltage at each of the at least one of the plurality of inputs.

Alternatively or additionally to any of the embodiments above, the second controller may make event driven requests to the first controller at a rate that is less than one-tenth of the rate that the first controller repeatedly receives the voltage values representative of the voltage at each of the at least one of the plurality of inputs.

Alternatively or additionally to any of the embodiments above, the second controller may make event driven requests to the first controller at intervals of 0.7 seconds or more, and the first controller repeatedly receives the voltage values representative of the voltage at each of the at least one of the plurality of inputs at intervals of 200 ms or less.

Alternatively or additionally to any of the embodiments above, the second controller may be configured to determine a measure of energy used by at least part of the HVAC system based on the stored information related to the detected signal pulses.

Alternatively or additionally to any of the embodiments above, the stored information related to the detected signal pulses may comprise a pulse count since a last request by the second controller.

Alternatively or additionally to any of the embodiments above, the stored information related to the detected signal pulses may comprise a most recent positive pulse width and a most recent negative pulse width.

Alternatively or additionally to any of the embodiments above, the stored information related to the detected signal pulses may comprise a moving average of a measure of a pulse rate.

Alternatively or additionally to any of the embodiments above, the second controller may comprise a Java emulator running a function block engine.

In another example, an HVAC controller for controlling operation of at least part of an HVAC system may include a housing, a plurality of inputs carried by the housing and accessible from outside of the housing, a plurality of outputs carried by the housing and accessible from outside of the housing, a first controller housed by the housing and operatively coupled to the plurality of inputs and the plurality of outputs, wherein the first controller may be configured to repeatedly receive a voltage value representative of an analog voltage at each of at least two of the plurality of inputs, and to compare the repeatedly received voltage values to a corresponding voltage threshold setting stored in a memory of the first controller to detect signal pulses on each of the at least two of the plurality of inputs, the first controller may further be configured to store information related to the detected signal pulses, and a second controller housed by the housing and operatively coupled to the first controller, where the second controller may be configured to make a first request to the first controller for at least some of the stored information related to the detected signal pulses associated with a first one of the at least two of the plurality of inputs, and is further configured to make a second request to the first controller for the voltage value representative of the voltage at a second one of the at least two of the plurality of inputs.

Alternatively or additionally to any of the embodiments above, the second controller may make requests to the first controller at a rate that is less than one-fifth of the rate that the first controller repeatedly receives the voltage values representative of the voltage at each of the at least two of the plurality of inputs.

Alternatively or additionally to any of the embodiments above, the second controller may make event driven requests to the first controller at intervals of 0.7 seconds or more, and the first controller repeatedly receives the voltage values representative of the voltage at each of the at least two of the plurality of inputs at intervals of 200 ms or less.

Alternatively or additionally to any of the embodiments above, the second controller may be configured to determine a measure of energy used by at least part of the HVAC system based on the stored information related to the detected signal pulses.

Alternatively or additionally to any of the embodiments above, the stored information may be related to the detected signal pulses comprises a pulse count since a last request by the second controller.

Another example may include a housing, a plurality of inputs carried by the housing and accessible from outside of the housing, a plurality of outputs carried by the housing and accessible from outside of the housing, a first controller housed by the housing and operatively coupled to the plurality of inputs and the plurality of outputs, the first controller may be configured to detect signal pulses on each of at least one of the plurality of inputs, the first controller may be further configured to detect when a signal pulse is not detected on a particular one of the plurality of inputs for at least a threshold period of time, and in response, the first controller may be configured to insert a simulated signal pulse, the first controller may be further configured to store information related to the detected signal pulses and the simulated signal pulses when present, and a second controller housed by the housing and operatively coupled to the first controller, the second controller may be configured to make requests to the first controller for at least some of the stored information related to the detected signal pulses and the simulated signal pulses when present.

Alternatively or additionally to any of the embodiments above, the second controller may be configured to determine a measure of energy used by at least part of the HVAC system based on the stored information related to the detected signal pulses and the simulated signal pulses when present.

Alternatively or additionally to any of the embodiments above, the second controller may comprise an event driven controller that may be configured to make event driven requests to the first controller, wherein the requests to the first controller for at least some of the stored information related to the detected signal pulses and the simulated signal pulses when present are event driven requests.

The above summary of some illustrative embodiments is not intended to describe each disclosed embodiment or every implementation of the present disclosure. The Figures and Description which follow more particularly exemplify these and other illustrative embodiments.

BRIEF DESCRIPTION OF THE FIGURES

The disclosure may be more completely understood in consideration of the following description in connection with the accompanying drawings, in which:

FIGS. 2A-5B show illustrative methods of controlling operation of at least part of an HVAC system.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used connection with other embodiments whether or not explicitly described unless clearly stated to the contrary.

The following description should be read with reference to the drawings in which similar structures in different drawings are numbered the same. The drawings, which are not necessarily to scale, depict illustrative embodiments and are not intended to limit the scope of the disclosure.

Although examples of construction, dimensions, and materials may be illustrated for the various elements, those skilled in the art will recognize that many of the examples provided have suitable alternatives that may be utilized.

The current disclosure relates to devices, controllers, systems, computer programs, and methods adapted for monitoring and controlling building automation systems such as, for example, heating, ventilating, and air conditioning (HVAC) systems. In some cases, signal pulses may be detected and measurement values may be identified and stored for the HVAC system. In some instances, requests may then be made for the measurement values and used to determine conditions or characteristics about the HVAC system, for example, the operational status of a component or components of the HVAC system, energy usage for some or all of the HVAC system, degradation and/or issues concerning the HVAC system, etc.

Figure 1:
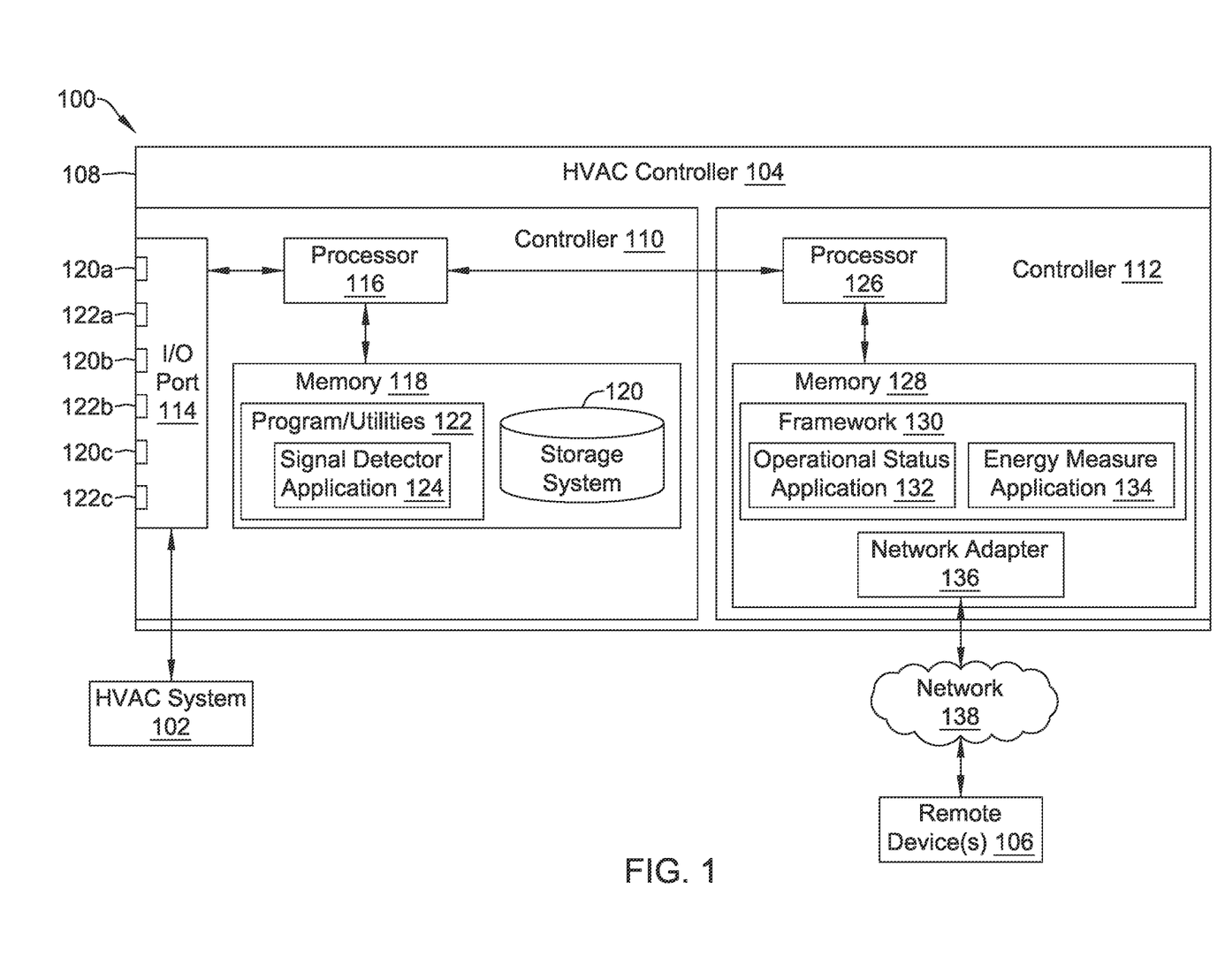
FIG. 1 is a schematic view of an illustrative heating, ventilating, and air conditioning (HVAC) system.

FIG. 1 is a schematic view of an illustrative HVAC control system 100. As shown, the illustrative HVAC control system 100 includes an HVAC system 102, an HVAC controller 104, and remote device(s) 106. In some cases, the HVAC controller 104 may communicate with one or more components/devices of the HVAC system 102 to monitor and control the HVAC system 102. In some instances, the HVAC system 102 may include one or more Air Handing Units (AHU), Variable-Air-Volume (VAV) units, dampers, valves, fans, heating units, cooling units, sensors, thermostats, humidifiers, dehumidifiers, controllers (e.g., onboard or local controllers for HVAC subsystems), and/or any other suitable component.

In some cases, the HVAC controller 104 may include a housing 108, a controller 110, and a controller 112. In some cases, the HVAC controller 104 may include more or fewer components. In some examples, the controller 110 may be a direct digital control (DDC) controller, but this is not required. In some instances, the controller 110 may include an input/output (I/O) port 114, a processor 116, and memory 118. In some cases, the I/O port 114 may include a plurality of inputs 120A-120C and a plurality of outputs 122A-122C that are accessible from outside the housing 108. In some examples, the I/O port 114 may include more or fewer inputs and outputs. Moreover, in some examples, the inputs 120A-120C and the outputs 122A-122C may be connected to the HVAC system 102 and/or an onboard controller(s) of the HVAC system 102 through a wired or wireless network. In some cases, the inputs 120A-120C and the outputs 122A-122C may receive electrical signals such as, for example, voltage signals, current signals and the like from the HVAC system 102 and use the signals to identify values, detect signal pulses and the like. In some cases, the inputs 120A-120C may receive signals at intervals of 50 ms or less, 100 ms or less, 200 ms or less, 300 ms or less, 400 ms or less, 500 ms or less, 600 ms or less, and 700 ms or less, for example. In some cases, the I/O port may include an analog-to-digital (A/D) converter for each input that converts analog input signals into digital representations of the analog signals, which are then delivered to the processor 116. The analog-to-digital (A/D) converter may sample the analog input signal at a rate of 50 Hz or more, 100 Hz or more, 200 Hz or more, 500 Hz or more, 1000 Hz or more, or any other sample rate. The sample rate may be at least two times the highest frequency in the signal that is desired to be detected (e.g. at or above the Nyquist rate).

In some instances, the processor 116 may include a pre-programmed chip, such as a very-large-scale integration (VLSI) chip and/or an application specific integrated circuit (ASIC). In such examples the chip may be pre-programmed with control logic in order to control the operation of the controller 110. In some cases, the pre-programmed chip may implement a state machine that performs the desired functions. By using a pre-programmed chip, the processor 116 may use less power than other programmable circuits (e.g. general purpose programmable microprocessors) while still being able to maintain basic functionality. In other instances, the processor 116 may include a programmable microprocessor. Such a programmable microprocessor may allow a user to modify the control logic of the controller 110 even after it is installed in the field (e.g. firmware update), which may allow for greater flexibility of the controller 110 in the field over using a pre-programmed ASIC. In either case, the processor 116 may be programmed to direct the controller 110 to communicate with and monitor/control the HVAC system 102.

In some cases, the memory 118 may be operatively coupled to the processor 116 and may be used to store any desired information, such as information related to received signals from the I/O port 114 (e.g., measurements and values representative of the received signals). In some instances, the memory 118 may include a storage system 120 that may be any suitable type of storage including, but not limited to, RAM, ROM, EPROM, flash memory (e.g., NAND flash memory), an external SPI flash memory, a hard drive, and/or the like. In some cases, the storage system 120 may include two or more types of memory. For example, the storage system 120 may include a RAM, a ROM and a flash memory module. During operation, the processor 116 may store information within the storage system 120, and may subsequently retrieve the stored information from the storage system 120.

Program/utility 122 may be stored in the memory 118 and may include one or more application program modules (e.g. software), such as a signal detector application 124. In some cases, the program/utility 122 may include additional program modules as well as an operating system, one or more other application program modules, and program data. According to various examples, the application program modules (e.g., the signal detector application 124) may include threshold settings, time periods, counters, and analytics, for example. In some cases, the signal detector application 124 may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

In some cases, the signal detector application 124 may provide instructions to the processor 116 to detect signal pulses and identify signal values of the signals from the I/O port 114 and store information related to the detected signals pulses and the identified signal values. For example, the controller 110 may receive signals at the I/O port 114 at intervals of 200 ms or less. As such, in accordance with the instructions provided by the signal detector application 124, the processor 116 may access a voltage threshold stored in the storage system 120 and compare voltage signals received from inputs 120A and 120B (via A/D converters) to detect signal pulses of the signals. For instance, the processor 116 may determine each time the voltage signals from the inputs 120A and 120B move above the voltage threshold to detect a positive transition of each signal pulse, and each time the voltage signals move below the voltage threshold to detect a negative transition of each signal pulse.

The processor 116 may then identify information related to the detected signal pulses. For instance, the processor 116 may count the detected signals pulses and store the count in the storage system 120. In some cases, the processor 116 may identify voltage values of the detected signal pulses and store the voltage values in the storage system 120. In some examples, the processor 116 may identify positive pulse widths and negative pulse widths of the detected signal pulses and store the pulse widths in the storage system 120. In some examples, the processor 116 may identify a measure of a pulse rate for the detected signal pulse and store the measure of pulse rate in the storage system 120. The pulse rate may be based on the interval of the signal pulses, and sometimes may be an average of the intervals of the last "N" pulses, wherein "N" is an integer greater than 1. These are just a few examples of information related to the detected signal pulses that may be identified/determined by the processor 116 and stored in storage system 120.

In some cases, when a pulsed energy meter is connected to one or more of the inputs, the information identified and stored by the processor 116 may be used to assist in determining a measure of energy measured by the energy meter. For example, the pulse rate and/or the average pulse rate (e.g., the moving average of the measure of the pulse rate) may be a good indicator of the current or average energy measured by the energy meter.

In some instances, the pulse rates stored in the storage system 120 may not properly represent the pulse rates of the detected signal pulses. For example, the moving average of the measure of the pulse rate may indicate the average rates of the last four signal pulses detected. However, if the voltage signals from the inputs 120A and 120B, which are coupled to terminals of a pulsed energy meter, suddenly went to zero or peaked at a voltage that remained above or below the voltage threshold, signal pulses would not be detected by the processor 116. As such, the current pulse rate and/or the moving average of the measure of the pulse rate should go down to reflect that no signal pulses are being detected (i.e. no energy is being detected by the energy meter). However, since no signal pulses are being detected, the current pulse rate and the moving average of the measure of the pulse rate for the last four signal pulses detected may remain the same since there may not be any updates with new values. Accordingly, the pulse rates that remain in the storage system 120 may not be representative of the actual pulse rates from the inputs 120A and/or 120B.

As such, in some instances, the signal detector application 124 may provide instructions to the processor 116 to insert a simulated pulse when the processor 116 has not detected a signal pulse within a certain period of time from the last detected pulse. For example, the processor 116 may identify that the current pulse rate of the received signals is one pulse per 250 ms. Since the current pulse rate is at one pulse per 250 ms, the processor 116 may set a time period threshold of one second. Accordingly, if the processor 116 does not detect a signal pulse for one second, the processor 116 may insert a simulated pulse. In this case, the current pulse rate will fall to one pulse per second and the moving average of the measure of the pulse rate for the last four signal pulses will also fall with the inclusion of the new current pulse rate in the moving average. These values may then be stored in the storage system 120 to provide a better representation of the pulse rates (and thus energy consumption measured by the energy meter) of the detected signal pulses. Subsequently, since the current pulse rate is now at one pulse per second, the processor 116 may increase the time period threshold to two seconds or some other value. If the processor 116 does not detect a signal pulse for two seconds, the processor 116 may insert another simulated pulse. In this case, the current pulse rate will now fall to one pulse per two seconds. Additionally, the moving average of the measure of the pulse rate for the last four signal pulses will also fall and these values may then be stored in the storage system 120. The processor 116 may continue this process until the time period threshold has been increased so much that the current pulse rate and/or the moving average are either at or close to zero. Using this method, not only can the stored values provide a better representation of the pulse rates of the detected signal pulses, but the values may also provide more insight into the actual characteristics or trends of the voltage signals since the values may be attentive to fluctuations and/or abrupt changes in the operating parameters of the voltage signals.

As stated above, the HVAC controller 104 may also include the controller 112 operatively coupled to the controller 110. In some cases, the controller 112 may include a processor 126 and a memory 128. The processor 126 and the memory 128 may be configured similar to the configurations discussed in regard to the processor 116 and the memory 118. In some cases, the controller 112 may be an event driven controller, but this is not required. When so provided the processor 126 may be provided instructions from application program modules (e.g., operation status application 132 and energy measure application 134) in response to events such as user actions (e.g., mouse clicks, key presses), sensor outputs, messages from other programs, etc. The event driven application program modules can be written in any programming language, for example, Java.

In some cases, the controller 112 and/or processor 126 may implement a Java emulator running a function block engine, for example, a function block engine as discussed in U.S. Pat. No. 9,726,392 B2 GENERIC USER INTERFACE SYSTEM, U.S. Pat. No. 8,982,632 B2 FUNCTION BLOCK EXECUTION FRAMEWORK, U.S. Pat. No. 8,954,543 B2 FLEXIBLE GRAPHICAL EXTENSION ENGINE, U.S. Pat. No. 8,650,306 B2 INTEROPERABLE NETWORK PROGRAMMABLE CONTROLLER GENERATION SYSTEM, U.S. Pat. No. 8,418,128 B2 GRAPHICAL LANGUAGE COMPILER SYSTEM, U.S. Pat. No. 8,239,500 B2 FLEXIBLE GRAPHICAL EXTENSION ENGINE, U.S. Pat. No. 8,112,162 B2 SYSTEM LEVEL FUNCTION BLOCK ENGINE, U.S. Pat. No. 7,826,929 B2 LOW COST PROGRAMMABLE HVAC CONTROLLER HAVING LIMITED MEMORY RESOURCES, U.S. Pat. No. 7,738,972 B2 MODULAR SHARED-MEMORY RESOURCE STAGE DRIVER SYSTEM FOR FLEXIBLE RESOURCE LINKING IN AN ENERGY CONVERSION SYSTEM, and U.S. Pat. No. 7,653,459 B2 VAV FLOW VELOCITY CALIBRATION AND BALANCING SYSTEM, the disclosures of which are incorporated herein by reference. Moreover, in some cases, a framework 130 may be stored in the memory 128 that configures the processor 126 into a Java Application Control Engine (JACE). In some examples, the framework 130 may be a Niagara R2 version framework, a Niagara AX version framework, a Niagara 4 version framework, etc. The HVAC controller 104 may run a Java VM (Virtual Machine) that is programmed to monitor and control the HVAC system 102.

In some cases, the controller 112 may also include a network adapter 136 to communicate with the one or more remote device(s) 106 such as, for example, the HVAC system 102, other building automation systems, a field device, a smart phone, tablet computer, laptop computer, personal computer, PDA, and/or the like over a wired or wireless network 138 or networks. The wireless network(s) can be, for instance, a wide area network (WAN) such as the Internet, a local area network (LAN), a personal area network (PAN), a campus area network (CAN), or metropolitan area network (MAN), among other types of wireless networks. In some instances, the controller 112 may include a communication port (not explicitly shown). It is contemplated that the communication ports may be wired and/or wireless. When the communication ports are wireless, the communication port may include a wireless transceiver, and the remote device(s) 106 may include a compatible wireless transceiver. It is contemplated that the wireless transceivers may communicate using a standard and/or a proprietary communication protocol. Suitable standard wireless protocols may include, for example, cellular communication, Lon, BACnet, Modbus, ZigBee, Bluetooth, WiFi, IrDA, dedicated short range communication (DSRC), EnOcean, or any other suitable wireless protocols, as desired. In some cases, the remote device(s) 106 may provide a primary and/or a secondary user interface for a user to interact with the HVAC controller 104.

In some cases, the processor 126 may make a first event driven request to the processor 116 for some or all of the stored information related to the detected signal pulses such as, for example, the count of the detected signal pulses, the positive and/or negative pulse widths of the detected signal pulses, the pulse rate for each detected signal pulse, and the moving average of the measure of the pulse rate, from the input 120A. Additionally, the processor 126 may make a second event driven request to the processor 116 for a voltage value representative of the voltage signal from the input 120B. In response, the processor 116 may access the storage system 120 for the stored information related to the detected signal pulses from the input 120A and determine the voltage value representative of the voltage signal from the input 120B and provide the stored information and the voltage value to the processor 126. The processor 126 may then determine the energy measured by the energy meter that is connected to input 120A. The processor 126 may also determine an operational status of a component or sensed value of a sensor connected to the second input 120B based at least in part on the voltage value received from the processor 116. This is just one example and does not imply any limitations with regard to the HVAC controller 104 nor components of the HVAC system 102 in which different embodiments may be implemented. Many modifications to the HVAC system 102 may be made based on design and implementation requirements.

Figure 2A:
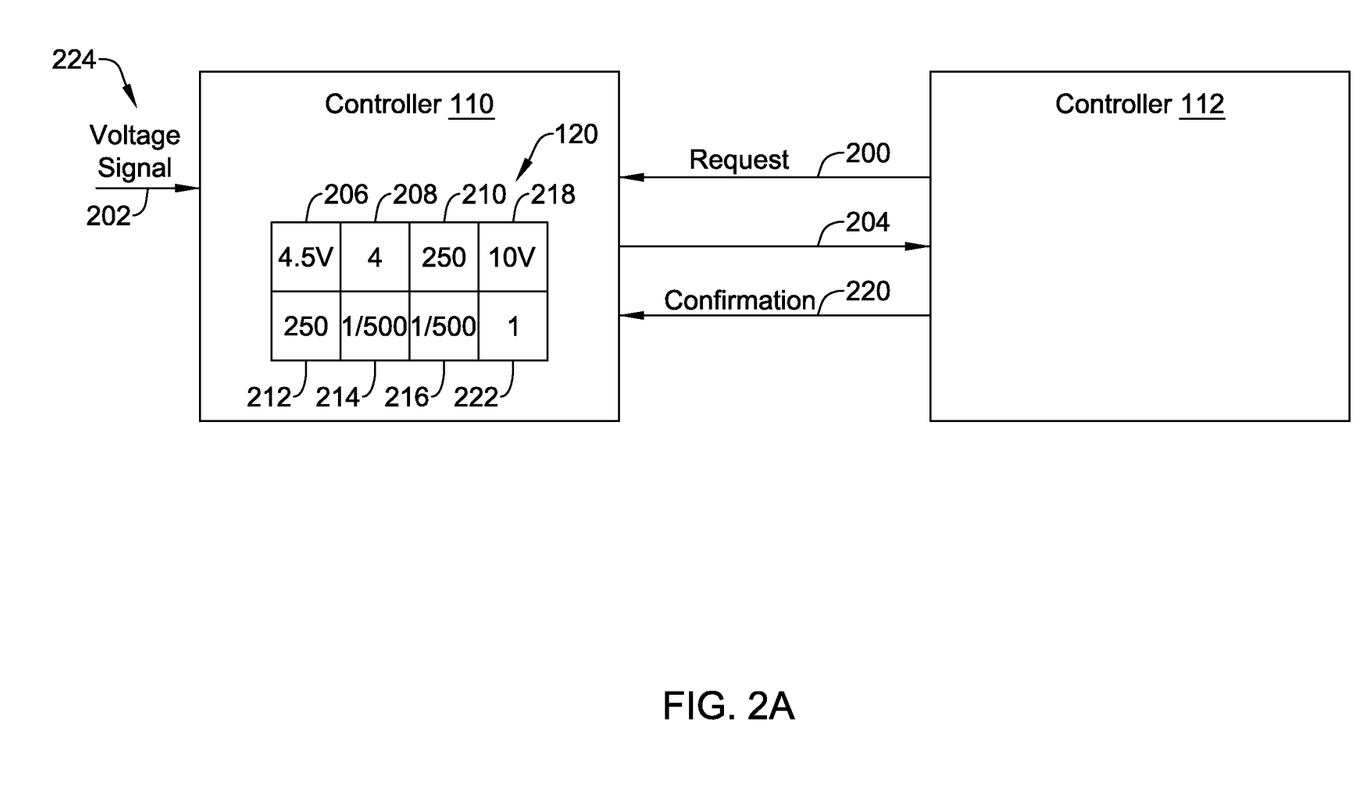
Figure 2B:
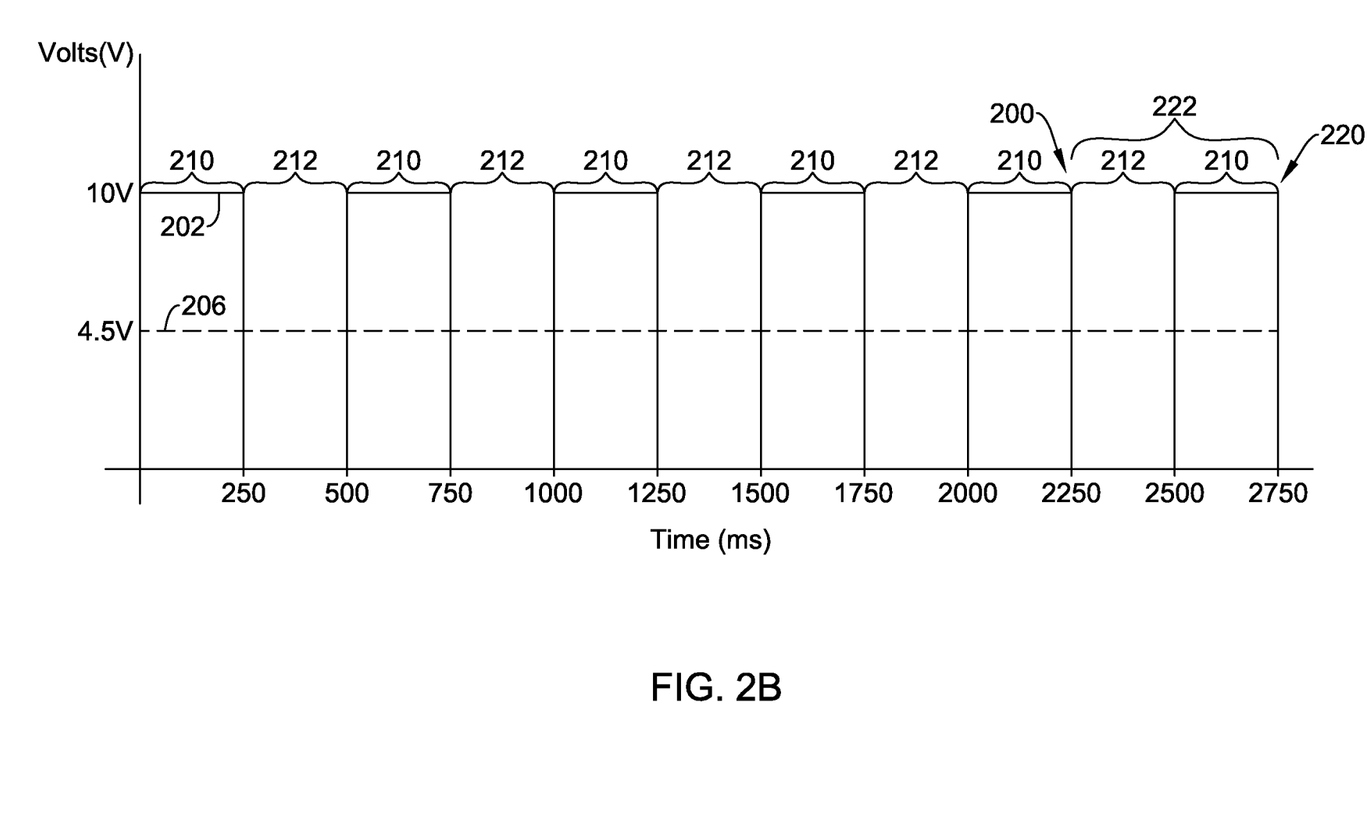

FIGS. 2A-2B show illustrative methods of controlling operation of at least part of an HVAC system. As shown in FIG. 2A, a voltage signal 202 may be received at a first input 224 of the controller 110. The "first input" may be any of the analog inputs of the HVAC controller. Turning to FIG. 2B, in this example, the voltage signal 202 from the first input 224 includes a square wave with a peak voltage value of 10V. As can be seen, the controller 110 stores a voltage threshold 206 of 4.5V. In other examples, the voltage threshold 206 may be established at a higher or lower voltage. In some cases, the controller 110 may compare the voltage threshold to the voltage signal 202 to detect signal pulses of the square voltage signal 202. For instance, the controller 112 may identify each time the square voltage signal 202 moves above and then below the voltage threshold 206 to detect the various signal pulses. In this example, as shown in FIG. 2A, the controller 110 may record/store information related to the detected signals in the storage system 120 such as, for example, a number (i.e., a count 208) of times the square voltage signal 202 moves above the voltage threshold 206, a most recent positive pulse width 210 of the square voltage signal 202, a most recent negative pulse width 212 of the square voltage signal 202, a current pulse rate 214, and a moving average of a measure of the pulse rate 216. In some cases, the storage system 120 may also include the voltage threshold 206 value (i.e., 4.5V), the peak voltage value 218 (i.e., 10 V), a pulse count 222 between a request signal 200 and a confirmation signal 220, as well as any other suitable parameter.

In some cases, the controller 112 may make a first request 200 to the controller 110 for some or all of the stored information related to the detected signal pulses of the square voltage signal 202 from the first input 224. In some cases, the first request 200 may be an event driven request, but this is not required. As discussed above, an event may be user action from a user interface or a remote device, a sensor output, signals from other programs/devices and/or any other event. As such, an event driven request may be a request from the controller 112 to the controller 110 in response to such an event. In some cases, the event driven requests may be periodic, e.g. such as a clock event. In some cases, the first event driven request may be at a rate that is less than one-fifth of the rate that the controller 110 receives the square voltage signal 202. In some cases, the first event driven request may be at a rate of 1 event per second, and the controller 110 receives the square voltage signal 202 at a rate of 1 pulse per 200 ms or less. In some cases, the first event driven request may be at a rate that is less than one-tenth of the rate that the controller 110 receives the square voltage signal 202. In some cases, the first event driven request may be at time intervals of 0.5, 0.6, 0.7, 0.8, 0.9, or 1.0 second or more. As shown in FIG. 2B, in this example, the controller 112 makes the first event request 200 at the 2250 ms mark. As can be seen in FIG. 2A, at the 2250 ms mark, the storage system 120 may include the most up-to-date (i.e., most recent) information/values related to the square voltage signal 202. For instance, the voltage threshold 206 is shown at 4.5V, the pulse count 208 is 4, the positive pulse width 210 is 250 ms, the negative pulse width 212 is 250 ms, the current pulse rate 214 is 1 pulse per 500 ms, the moving average of the measure of the pulse rate 216 is 1 pulse per 500 ms, and the peak voltage value is 10V. As shown, the controller 110 may send at least some of the information 204 to the controller 112 in response to the first event driven request 200. In some cases, the controller 112 may determine a measure of the energy measured by an energy meter providing the pulses to the first input 224 based at least in part on the information 204 received from the controller 110.

In some cases in response to receiving the information 204 from the controller 110, the controller 112 may send a confirmation 220 to the controller 110 that the information 204 was received. Turning momentarily to FIG. 2B, the confirmation 220 may be sent at the 2750 ms mark. As such, one pulse 222 may be counted between the time the request 200 is made (i.e., the 2250 ms mark) and the time the confirmation 220 is sent (i.e., the 2750 ms mark). As shown in FIG. 2A, in some cases, the controller 110 may continue to count the detected pulses in between the request 200 and the confirmation 220 and store the count 222 in the storage system 120. When the controller 110 receives the confirmation 220 from the controller 112, the controller 110 may replace the count 208 with the count 222 and continue to count the detected pulses. In this configuration, the controller 110 may maintain an accurate count of the number of detected pulses since the last first event driven request 200 was made by the controller 112. As such, the count 208 that is sent with the information 204 in response to the first event driven requests 200, may include the pulse count since the last first event driven request 200.

Figure 3A:
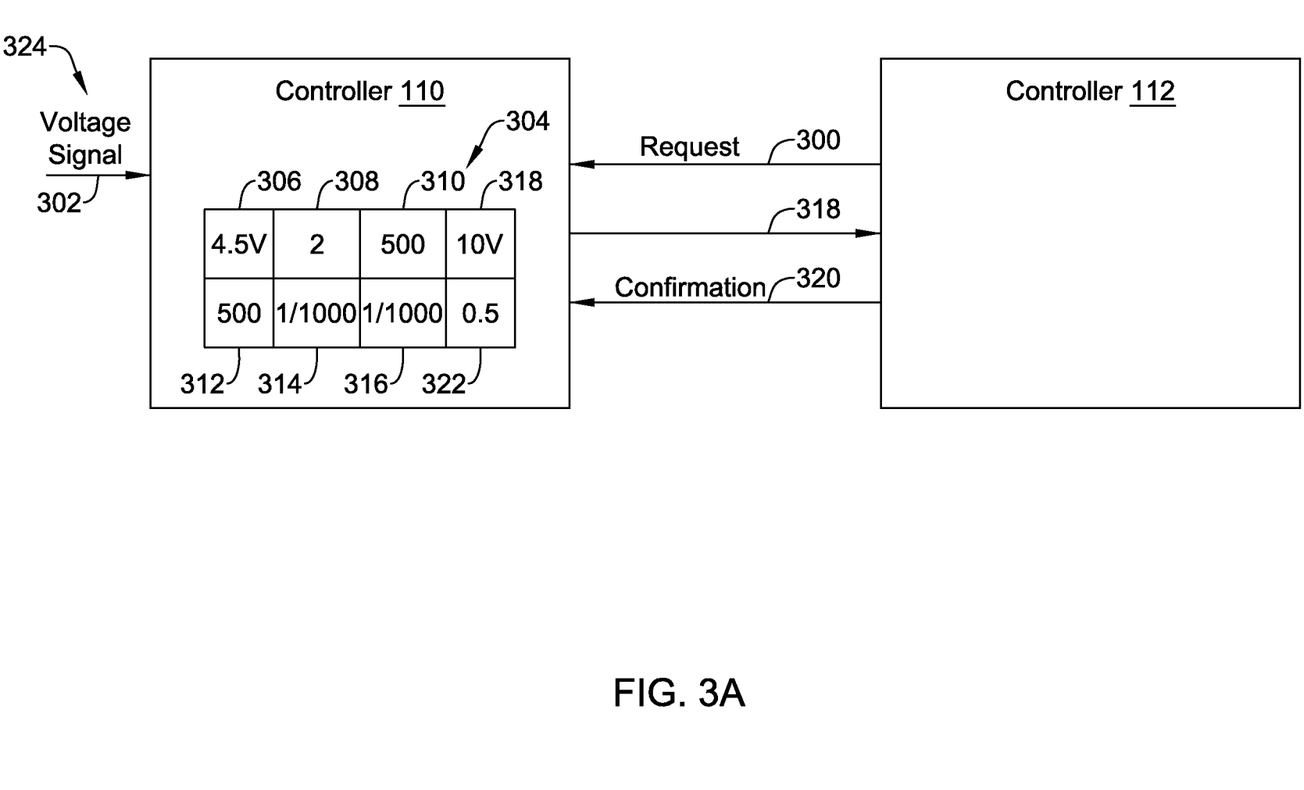
Figure 3B:
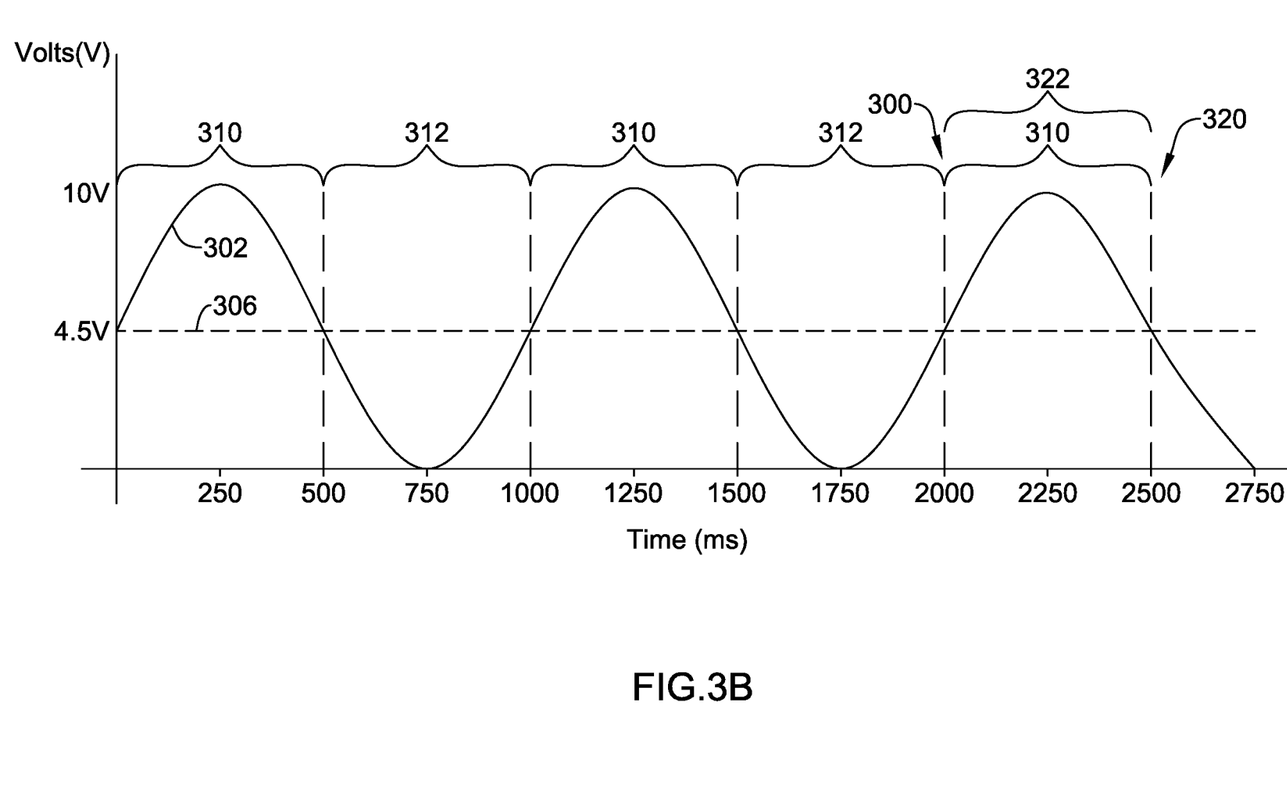

FIGS. 3A-3B show another illustrative method of controlling operation of at least part of an HVAC system. As shown in FIG. 3A, a voltage signal 302 may be received at a second input 324 of the controller 110. The "second input" may be any of the analog inputs of the HVAC controller. Turning to FIG. 3B, in this example, the voltage signal 302 from the second input 324 comprises a periodic sinusoidal wave with a peak voltage value of 10V. As can be seen, the controller 110 once again establishes a voltage threshold 306 at 4.5V. In some cases, the controller 110 may identify each time the sinusoidal voltage signal 302 moves above and below the voltage threshold 306 to detect signal pulses. In this example, the controller 112 may make a second event driven request 300 to the controller 110 for a voltage value representative of the voltage at the second input 324. In some cases, the controller 112 may make the second event request 300 at the 2000 ms mark as shown. As can be seen in FIG. 3A, the voltage threshold 306 is 4.5V, the pulse count 308 is 2, the positive pulse width 310 is 500 ms, the negative pulse width 312 is 500 ms, the current pulse rate 314 is 1 pulse per 1000 ms, the moving average of the measure of the pulse rate 316 is 1 pulse per 1000 ms, and the peak voltage value is 10V. As shown, the controller 110 may send this information to the controller 112 upon request.

In response to the voltage value 318 being received, the controller 112 may send a confirmation 320 to the controller 110 that the voltage value 318 was received. Turning momentarily back to FIG. 3B, the confirmation 320 may be sent at the 2500 ms mark. As such, a half pulse 322 may be counted between the time the request 300 is made (i.e., the 2000 ms mark) and the time the confirmation 320 is sent (i.e., the 2500 ms mark). As shown in FIG. 3A, the controller 110 may continue to count the detected pulses in between the request 300 and the confirmation 220 and store the count 308 in the storage system 120. Moreover, when the controller 110 receives the confirmation 320 from the controller 112, the controller 110 may replace the count 304 with the count 308 and continue to count the detected pulses. As such, the count 304 may comprise the pulse count since the last second event driven request 400.

Figure 4A:
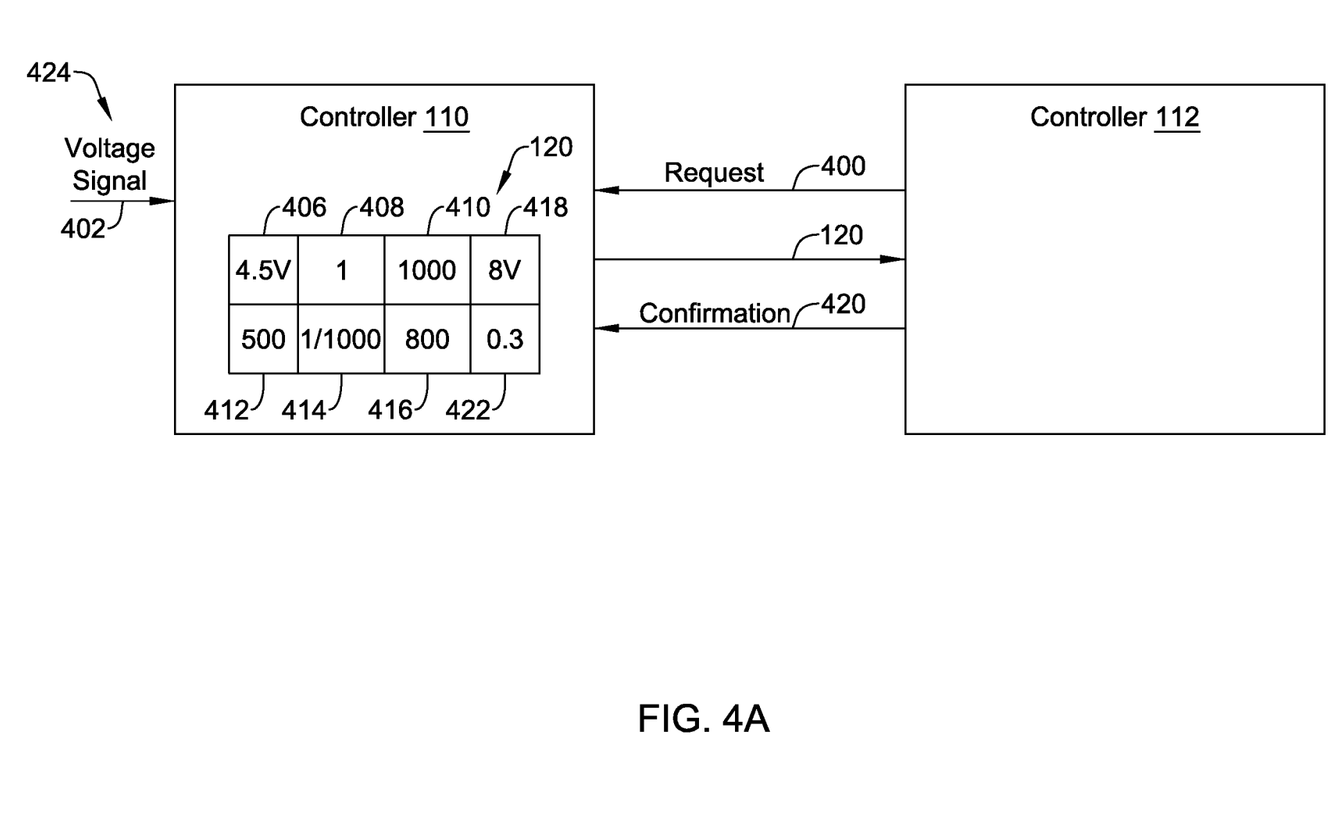
Figure 4B:
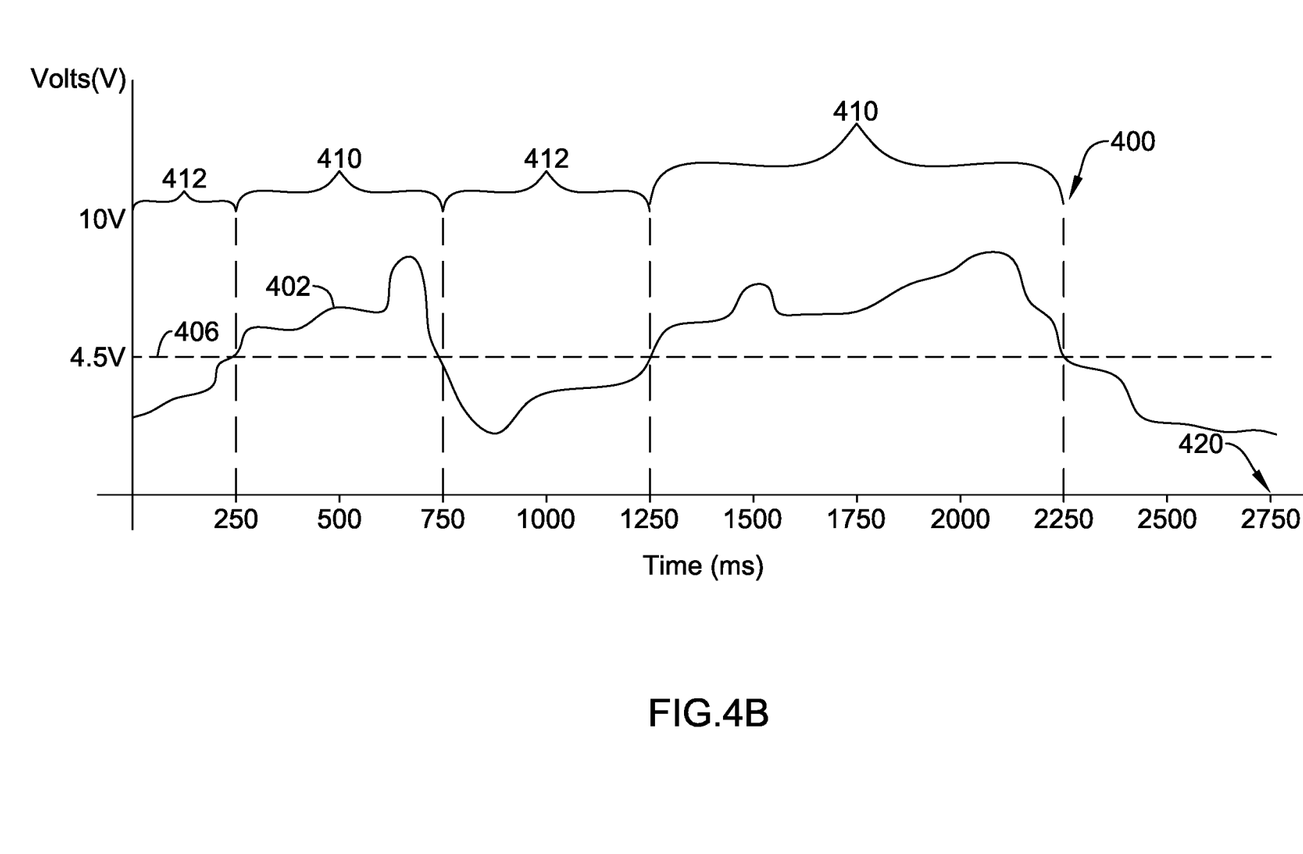

FIGS. 4A-4B show another illustrative method of controlling operation of at least part of an HVAC system. As shown in FIG. 4A, a voltage signal 402 may be received at a third input 424 of the controller 110. The "third input" may be any of the analog inputs of the HVAC controller. Turning to FIG. 3B, in this example, the voltage signal 402 is an aperiodic voltage signal such as a voltage signal representing temperature values from a temperature sensor, pressure values, atmospheric values, composition values, concentration values, and/or some other analog signal. As such, the voltage signal 402 received at the third input 424 may not be imposed with discrete signal pulses, but rather may represent a measured analog value. An A/D converter may convert the voltage signal to a digital value, which may be stored by controller 110. Even so, as can be seen in FIG. 4B, the controller 110 may still establish a voltage threshold 406 and compare the voltage threshold to voltage signal 402. Accordingly, as shown in FIG. 4A, the controller 110 may still identify and store a pulse count 408, a positive pulse width 410, a negative pulse width 412, a current pulse rate 414, a moving average of the measure of the pulse rate 416, and a pulse count 422 of the voltage signal 402, similar to the methods described in regard to FIGS. 2A-2B and FIG. 3A-3B, even though this information may have little value. The controller 112 may make a third event driven request 400 to the controller 110 for the digital value produced by the A/D converter. The information stored in the storage system 120 may be of little value unless a device is connected to the voltage signal 402 that imposes discrete signal pulses, such as an energy meter. However, the digital value produced by the A/D converter may be useful in determining a temperature or other parameter that can be used by the controller 110 and/or controller 112 to determine output signals to control the HVAC system.

As can be seen, the controller 110 can receive analog electrical signals and detect signal pulses from the analog electrical signals. The analog electrical signal may also be converted to a digital value via an analog-to-digital converter, thereby concurrently providing two different outputs including a detected signal pulse output and a digital representation of the analog electrical signal output. In some cases, when the analog input terminal is connected to a device that does not produce a pulsed output, such as a temperature sensor, the detected signal pulse output may have little meaning while the digital representation of the analog electrical signal output may be used in controlling the HVAC system. When the analog input terminal is connected to a device that does produce signal pulses, such as a pulsed energy meter, the detected signal pulse output may be used to monitor energy usage and/or perform some other function, while the digital representation of the analog electrical signal output may have little meaning.

Figure 5A:
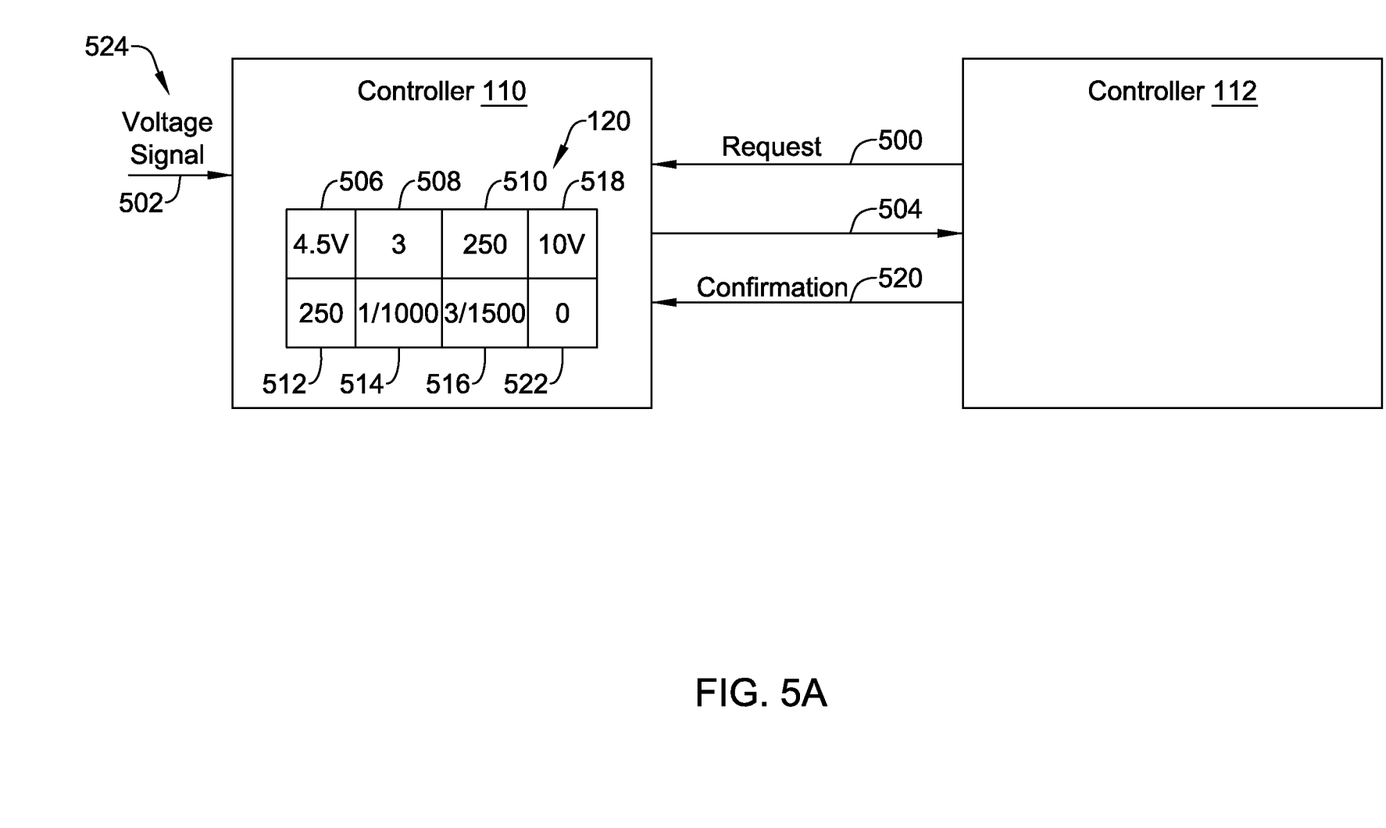
Figure 5B:
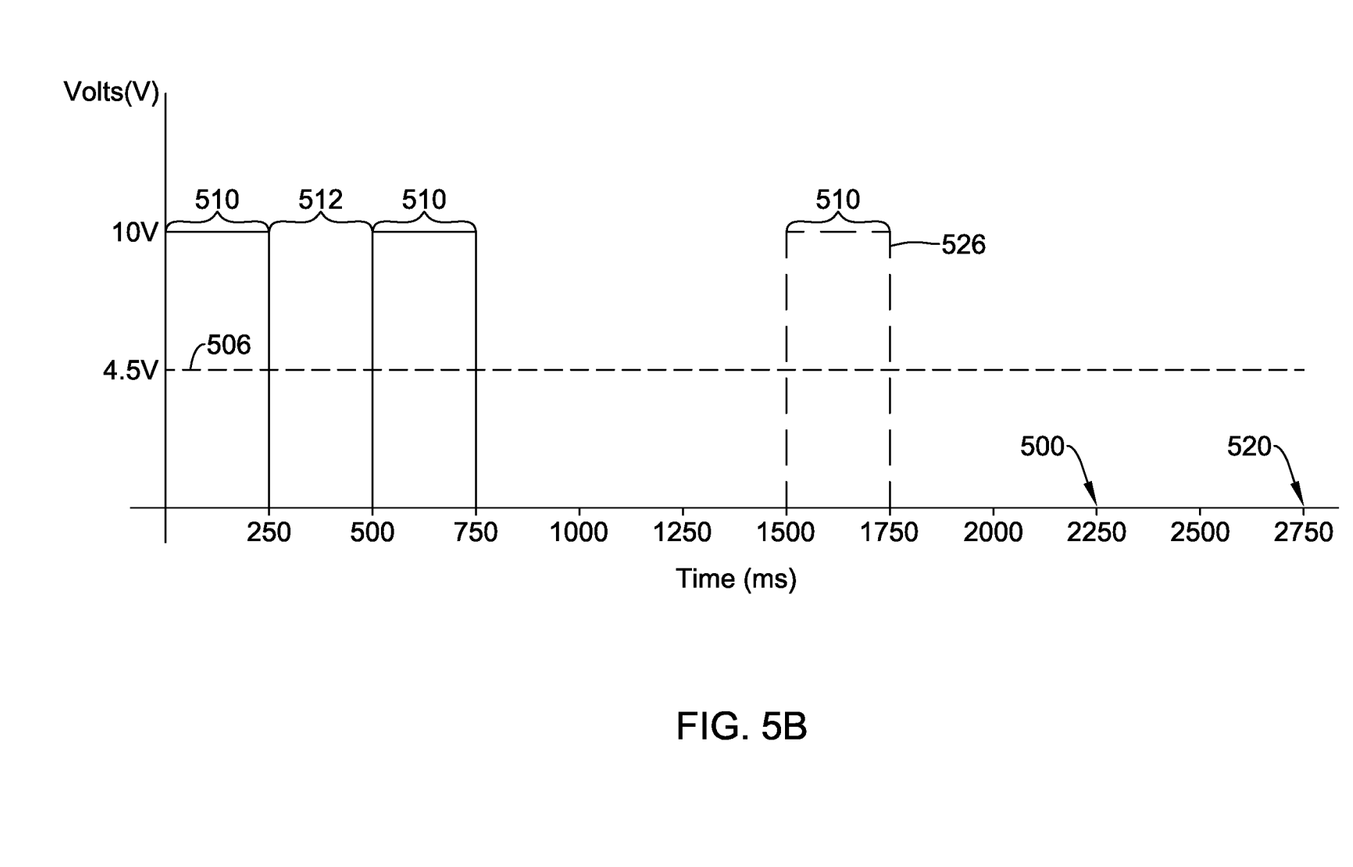

FIGS. 5A-5B show another illustrative method of controlling operation of at least part of an HVAC system. As shown in FIG. 5A, a voltage signal 502 may be received at a fourth input 524 of the controller 110. The "fourth input" may be any of the analog inputs of the HVAC controller. Turning to FIG. 5B, in this example, the voltage signal 502 from the fourth input 524 includes a relatively periodic square wave with a peak voltage value of 10V. As can be seen, the controller 110 establishes a voltage threshold 506 at 4.5V. In some cases, the controller 110 may identify each time the square voltage signal 502 moves above and below the voltage threshold 506 to detect signal pulses. In the example shown, the controller 110 may set a time period threshold (not shown) that the controller 110 may wait for another signal pulse to be detected. The time period threshold may be based on a current detected pulse rate 514. For instance, the controller 110 may wait longer if the current detected pulse rate is low and the controller 110 may not wait as long if the current detected pulse rate is high. In this example, at the 500 ms mark, the controller 110 may determine that a current pulse rate 514 is one pulse per 500 ms and the controller 110 may wait one second or the like for the next signal pulse. As shown, at the 1500 ms mark, the controller 110 has not detected the next signal pulse. In response, the controller 110 may insert a simulated signal pulse 526 at the 1500 ms mark. Moreover, since the current pulse rate 514 has gone down to one pulse per 1000 ms, the controller 110 may wait longer (e.g., two seconds) before inserting another simulated signal pulse.

In this example, the controller 112 may make a fourth event driven request 500 to the controller 110 for some or all of the stored information related to the detected signal pulses of the square voltage signal 502 from the fourth input 524. In some cases, the controller 112 may make the fourth event request 500 at the 2250 ms mark (i.e., less than one-tenth of 200 ms). As can be seen in FIG. 5A, in this example, the storage system 120 includes information related to both the detected signal pulses and the simulated signal pulse 526. As such, the voltage threshold 506 is 4.5V, the pulse count 508 is 3, the positive pulse width 510 is 250 ms, the negative pulse width 512 is 250 ms, the current pulse rate 514 is 1 pulse per 1000 ms, the moving average of the measure of the pulse rate 516 is 3 pulses per 1500 ms, and the peak voltage value 518 is 10V. As shown, the controller 110 may send at least some of the information 504 to the controller 112 in response to the fourth event driven request 500. In some cases, the controller 112 may determine a measure of energy sensed by an energy meter coupled to the fourth input based at least in part on the information 504 received from the controller 110. Moreover, in response to the information 504 being received, the controller 112 may send a confirmation 520 to the controller 110 that the information 504 was received. Turning momentarily back to FIG. 5B, the confirmation 520 may be sent at the 2750 ms mark. In this case, no signal has been detected since the simulated signal pulse 526. Accordingly, as shown in FIG. 5A, a count 522 of the detected pulses between the request 500 and the confirmation 520 is zero.

Figure 6:
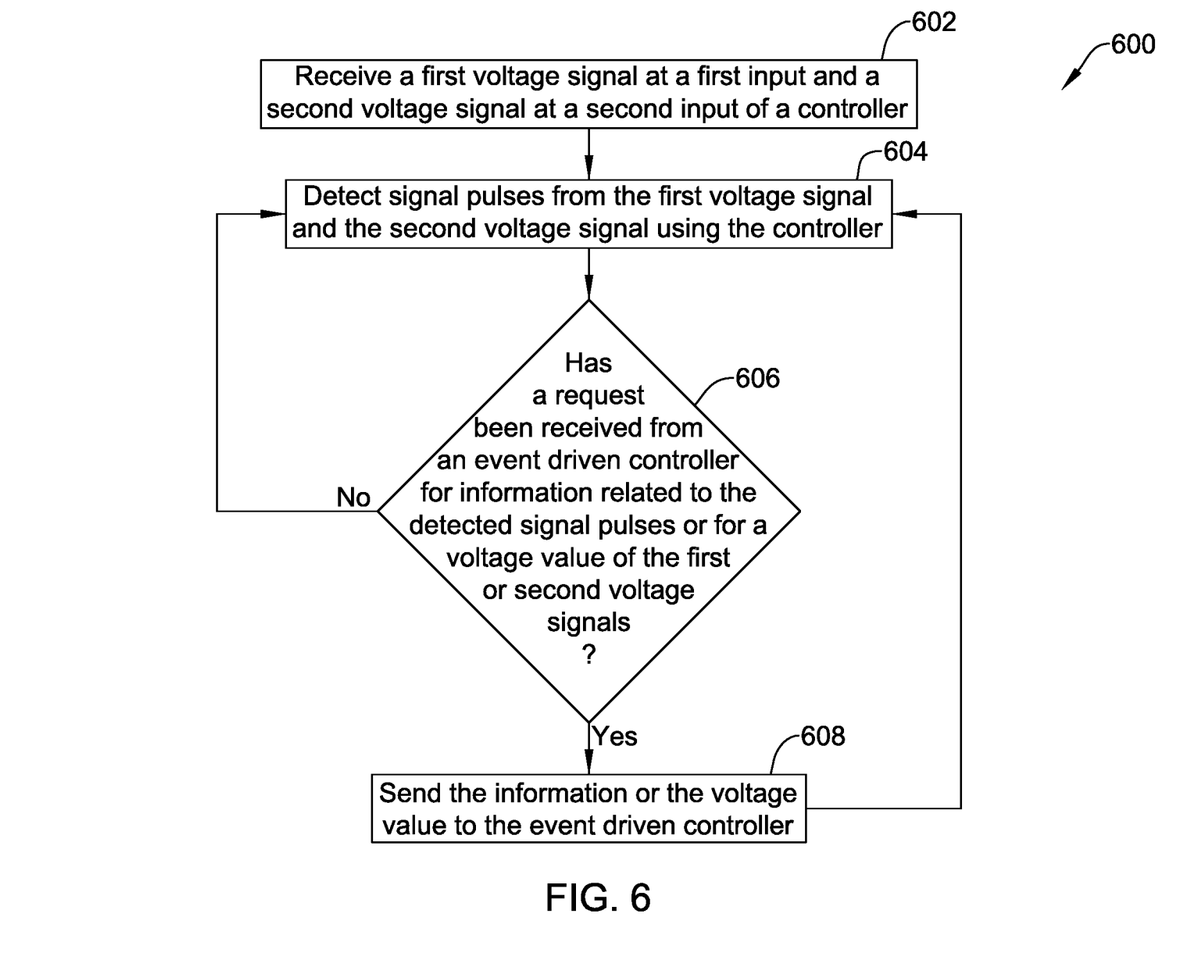
FIG. 6 is a flow chart showing an illustrative method of controlling operation of at least part of an HVAC system.

FIG. 6 is a flow chart showing an illustrative method 600 of controlling operation of at least part of an HVAC system. The method 600 begins at step 602, where a first voltage signal is received at a first input of a controller and a second voltage signal is received at a second input of the controller. At step 604, the controller detects signal pulses from the first voltage signal and the second voltage signal. At step 606, it is determined if a request has been received from an event driven controller for information related to the detected signal or if a request has been received from the event driven controller for a voltage value representative of the first or second voltage signals. If no request has been received, at step 604, the controller continues to detect signal pulses from the first and second voltage signals. If either request has been received, at step 608, the controller sends the corresponding pulse information or corresponding voltage value to the event driven controller and at step 604, and continues to detect signal pulses and voltage values.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A Heating, Ventilating and Air Conditioning (HVAC) controller for controlling operation of at least part of an HVAC system, the HVAC controller comprising:
   a housing;
   a plurality of inputs of the HVAC Controller carried by the housing and accessible from outside of the housing;
   a plurality of outputs of the HVAC Controller carried by the housing and accessible from outside of the housing;
   a first controller housed by the housing and operatively coupled to the plurality of inputs and the plurality of outputs, the first controller configured to detect signal pulses on each of at least one of the plurality of inputs and store information related to the detected signal pulses; and
   a second controller housed by the housing and operatively coupled to the first controller, the second controller comprising an event driven controller that is configured to make event driven requests to the first controller for at least some of the stored information related to the detected signal pulses.

2. The HVAC controller of claim 1, wherein the first controller is configured to repeatedly receive a voltage value representative of a voltage at each of the at least one of the plurality of inputs, and to compare the repeatedly received voltage values to a corresponding voltage threshold setting stored in a memory of the first controller to detect the signal pulses on each of the at least one of the plurality of inputs.

3. The HVAC controller of claim 2, wherein the first controller is configured to also make available to the second controller the voltage value representative of the voltage at each of the at least one of the plurality of inputs upon request by the second controller.

4. The HVAC controller of claim 2, wherein the first controller is configured to detect signal pulses on each of at least two of the plurality of inputs and store information related to the detected signal pulses, and the second controller is configured to make a first event driven request to the first controller for at least some of the stored information related to the detected signal pulses associated with a first one of the at least two of the plurality of inputs, and is further configured to make a second event driven request to the first controller for the voltage value representative of the voltage at a second one of the at least two of the plurality of inputs.

5. The HVAC controller of claim 2, wherein the second controller makes event driven requests to the first controller at a rate that is less than one-fifth of the rate that the first controller repeatedly receives the voltage values representative of the voltage at each of the at least one of the plurality of inputs.

6. The HVAC controller of claim 2, wherein the second controller makes event driven requests to the first controller at a rate that is less than one-tenth of the rate that the first controller repeatedly receives the voltage values representative of the voltage at each of the at least one of the plurality of inputs.

7. The HVAC controller of claim 2, wherein the second controller makes event driven requests to the first controller at intervals of 0.7 seconds or more, and the first controller repeatedly receives the voltage values representative of the voltage at each of the at least one of the plurality of inputs at intervals of 200 ms or less.

8. The HVAC controller of claim 1, wherein the second controller is configured to determine a measure of energy used by at least part of the HVAC system based on the stored information related to the detected signal pulses.

9. The HVAC controller of claim 1, wherein the stored information related to the detected signal pulses comprises a pulse count since a last request by the second controller.

10. The HVAC controller of claim 1, wherein the stored information related to the detected signal pulses comprises a most recent positive pulse width and a most recent negative pulse width.

11. The HVAC controller of claim 1, wherein the stored information related to the detected signal pulses comprises a moving average of a measure of a pulse rate.

12. The HVAC controller of claim 1, wherein the second controller comprises a Java emulator running a function block engine.

13. A Heating, Ventilating and Air Conditioning (HVAC) controller for controlling operation of at least part of an HVAC system, the HVAC controller comprising:
    a housing;
    a plurality of inputs of the HVAC Controller carried by the housing and accessible from outside of the housing;

a plurality of outputs of the HVAC Controller carried by the housing and accessible from outside of the housing;

a first controller housed by the housing and operatively coupled to the plurality of inputs and the plurality of outputs, the first controller is configured to repeatedly receive a voltage value representative of a voltage at each of at least two of the plurality of inputs, and to compare the repeatedly received voltage values to a corresponding voltage threshold setting stored in a memory of the first controller to detect signal pulses on each of the at least two of the plurality of inputs, the first controller further configured to store information related to the detected signal pulses; and a second controller housed by the housing and operatively coupled to the first controller, the second controller is configured to make a first request to the first controller for at least some of the stored information related to the detected signal pulses associated with a first one of the at least two of the plurality of inputs, and is further configured to make a second request to the first controller for the voltage value representative of the voltage at a second one of the at least two of the plurality of inputs.

14. The HVAC controller of claim 13, wherein the second controller makes requests to the first controller at a rate that is less than one-fifth of the rate that the first controller repeatedly receives the voltage values representative of the voltage at each of the at least two of the plurality of inputs.

15. The HVAC controller of claim 13, wherein the second controller makes event driven requests to the first controller at intervals of 0.7 seconds or more, and the first controller repeatedly receives the voltage values representative of the voltage at each of the at least two of the plurality of inputs at intervals of 200 ms or less.

16. The HVAC controller of claim 13, wherein the second controller is configured to determine a measure of energy used by at least part of the HVAC system based on the stored information related to the detected signal pulses.

17. The HVAC controller of claim 13, wherein the stored information related to the detected signal pulses comprises a pulse count since a last request by the second controller.

18. A Heating, Ventilating and Air Conditioning (HVAC) controller for controlling operation of at least part of an HVAC system, the HVAC controller comprising:

a housing;

a plurality of inputs of the HVAC Controller carried by the housing and accessible from outside of the housing;

a plurality of outputs of the HVAC Controller carried by the housing and accessible from outside of the housing;

a first controller housed by the housing and operatively coupled to the plurality of inputs and the plurality of outputs, the first controller configured to detect signal pulses on each of at least one of the plurality of inputs;

the first controller further configured to detect when a signal pulse is not detected on a particular one of the plurality of inputs for at least a threshold period of time, and in response, the first controller is configured to insert a simulated signal pulse;

the first controller is further configured to store information related to the detected signal pulses and the simulated signal pulses when present; and a second controller housed by the housing and operatively coupled to the first controller, the second controller configured to make requests to the first controller for at least some of the stored information related to the detected signal pulses and the simulated signal pulses when present.

19. The HVAC controller of claim 18, wherein the second controller is configured to determine a measure of energy used by at least part of the HVAC system based on the stored information related to the detected signal pulses and the simulated signal pulses when present.

20. The HVAC controller of claim 18, wherein the second controller comprises an event driven controller that is configured to make event driven requests to the first controller, wherein the requests to the first controller for at least some of the stored information related to the detected signal pulses and the simulated signal pulses when present are event driven request.

* * * * *